(12) United States Patent
Tanaka

(10) Patent No.: US 12,425,788 B2
(45) Date of Patent: Sep. 23, 2025

(54) INFORMATION PROCESSING APPARATUS, INFORMATION PROCESSING METHOD, AND SOUND OUTPUT APPARATUS

(71) Applicant: SONY GROUP CORPORATION, Tokyo (JP)

(72) Inventor: Izuru Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 325 days.

(21) Appl. No.: 18/003,374

(22) PCT Filed: Jul. 1, 2021

(86) PCT No.: PCT/JP2021/025021
§ 371 (c)(1),
(2) Date: Dec. 27, 2022

(87) PCT Pub. No.: WO2022/009783
PCT Pub. Date: Jan. 13, 2022

(65) Prior Publication Data
US 2023/0247380 A1    Aug. 3, 2023

(30) Foreign Application Priority Data

Jul. 8, 2020  (JP) ................................. 2020-118004

(51) Int. Cl.
*H04S 7/00*     (2006.01)
*G06F 3/16*     (2006.01)
*H04R 1/10*     (2006.01)

(52) U.S. Cl.
CPC .................. *H04S 7/30* (2013.01); *G06F 3/16* (2013.01); *H04R 1/1041* (2013.01); *H04S 2400/11* (2013.01); *H04S 2420/01* (2013.01)

(58) Field of Classification Search
CPC .... H04S 7/30; H04S 2400/11; H04S 2420/01; G06F 3/16; H04R 1/1041

USPC ......................................................... 381/310
See application file for complete search history.

(56) References Cited

U.S. PATENT DOCUMENTS

| | | | |
|---|---|---|---|
| 2015/0296086 A1* | 10/2015 | Eckert | H04S 5/00 381/17 |
| 2019/0023282 A1* | 1/2019 | Kuroda | B60Q 5/006 |

FOREIGN PATENT DOCUMENTS

| | | |
|---|---|---|
| JP | 2005-269231 A | 9/2005 |
| JP | 2013-162284 A | 8/2013 |
| JP | 2016-021169 A | 2/2016 |
| WO | 2017/168602 A1 | 10/2017 |

OTHER PUBLICATIONS

International Search Report and Written Opinion of PCT Application No. PCT/JP2021/025021, issued on Oct. 5, 2021, 09 pages of ISRWO.

* cited by examiner

*Primary Examiner* — David L Ton
(74) *Attorney, Agent, or Firm* — CHIP LAW GROUP

(57) ABSTRACT

An information processing apparatus according to the present disclosure is an information processing apparatus that controls a plurality of notification sounds output from an output unit, and includes a notification sound arrangement unit that arranges positions where the plurality of notification sounds sound in a virtual sound field to be different from each other for each of the plurality of notification sounds.

18 Claims, 10 Drawing Sheets

INFORMATION PROCESSING APPARATUS, INFORMATION PROCESSING METHOD, AND SOUND OUTPUT APPARATUS

CROSS REFERENCE TO RELATED APPLICATIONS

This application is a U.S. National Phase of International Patent Application No. PCT/JP2021/025021 filed on Jul. 1, 2021, which claims priority benefit of Japanese Patent Application No. JP 2020-118004 filed in the Japan Patent Office on Jul. 8, 2020. Each of the above-referenced applications is hereby incorporated herein by reference in its entirety.

FIELD

The present disclosure relates to an information processing apparatus, an information processing method, and a sound output apparatus.

BACKGROUND

While a headphone is attached to an information terminal such as a smartphone to listen to music or the like, a notification sound may be sounded by an application program of the information terminal. In this case, the notification sound may be mixed with the music being appreciated and may be difficult to perceive.

CITATION LIST

Patent Literature

Patent Literature 1: JP 2013-162284 A

SUMMARY

Technical Problem

The present disclosure provides an information processing apparatus, an information processing method, and a sound output apparatus capable of enhancing the recognizability of a notification sound sounded through a headphone or the like.

Solution to Problem

An information processing apparatus according to the present disclosure controls a plurality of notification sounds output from an output unit, the information processing apparatus comprising: a notification sound arrangement unit that arranges positions where the plurality of notification sounds sound in a virtual sound field so as to be different from each other for each of the plurality of notification sounds.

Advantageous Effects of Invention

According to the information processing apparatus, the information processing method, and the sound output apparatus according to the present disclosure, it is possible to enhance the recognizability of the notification sound sounded through the headphone or the like.

DESCRIPTION OF EMBODIMENTS

Figure 1:
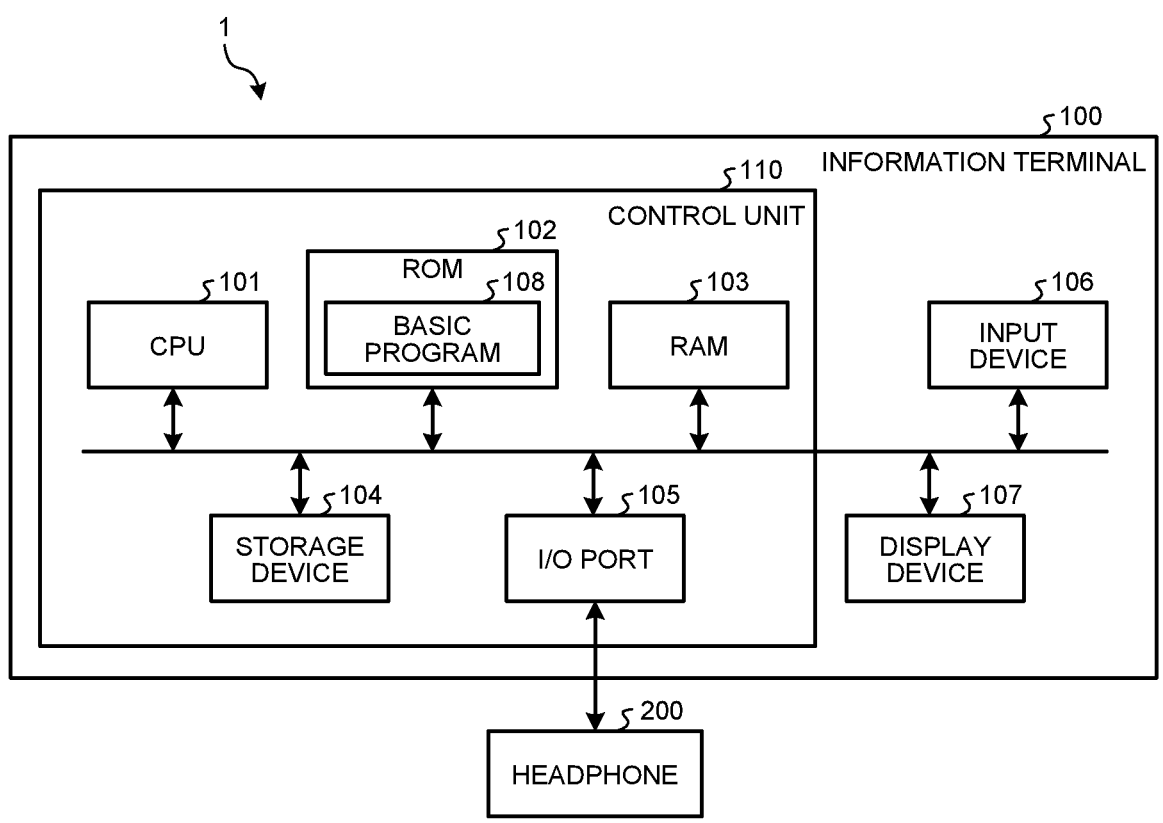
FIG. 1 is a block diagram illustrating an example of a hardware configuration of a sound output apparatus according to a first embodiment of the present disclosure.

Hereinafter, embodiments of the present disclosure will be described in detail with reference to the drawings. In each of the following embodiments, the same reference numerals are given to the same parts, and redundant description will be omitted.

First Embodiment

A first embodiment will be described with reference to the drawings.
(Configuration Example of Sound Output Apparatus)

FIG. 1 is a block diagram illustrating an example of a hardware configuration of a sound output apparatus 1 according to the first embodiment of the present disclosure. As illustrated in FIG. 1, the sound output apparatus 1 of the first embodiment includes an information terminal 100 and a headphone 200.

The information terminal 100 as an information processing apparatus is, for example, a smartphone, a mobile phone, a tablet, or the like. The information terminal 100 includes a control unit 110, an input device 106, and a display device 107.

The control unit 110 is configured as a computer including a central processing unit (CPU) 101, a read only memory (ROM) 102, a random access memory (RAM) 103, a storage device 104, and an in/out (I/O) port 105.

For example, the CPU 101 reads various programs stored in the ROM 102, develops the programs on the RAM 103, and operates according to the programs. As a result, the CPU 101 can implement various functions as an information processing apparatus.

The ROM 102 stores, for example, a basic program 108 such as an operating system (OS), and various application programs executed by the CPU 101. The basic program 108 is a program for operating the entire information terminal 100 and operating various application programs on the information terminal 100.

Among various application programs executed by the CPU 101, there is a program capable of transmitting various notification sounds for notifying the user of reception of an email, reception of an incoming call, and the like. The basic program 108 has a function of setting, for example, a sound field that is a virtual space having a three-dimensional spread, and arranging, in the sound field, positions where various notification sounds by the above-described application program sound. As a result, when various notification sounds are output from the headphone 200, the user feels that the respective notification sounds can be heard at different distances (closeness/distantness) from different directions.

Such a function of the basic program 108 is implemented using, for example, a stereophonic sound technology that reproduces a three-dimensional direction, distance, and spread in a pseudo manner when reproducing sound. The stereophonic sound technology may also be referred to as a 3D audio technology, a virtual phones technology (VPT), or the like.

The storage device 104 is, for example, a hard disk drive (HDD), a solid state drive (SDD), or the like, and is used as an auxiliary storage area.

The I/O port 105 is connected to a headphone 200 or the like which is an external device of the information terminal 100, and transmits various kinds of acoustic data including a notification sound or the like to the headphone 200.

The input device 106 is a device to which a user can input various instructions. The input device 106 may be configured integrally with the display device 107, for example, such as a touch panel.

The display device 107 is, for example, a liquid crystal display (LCD), an organic electro luminescence (EL) display, or the like, and displays various types of information to the user.

The headphone 200 as an output device includes, for example, two speakers that can be worn on the left and right ears of the user. The headphone 200 is connected to the information terminal 100, for example, and outputs various sounds on the basis of the acoustic data transmitted from the information terminal 100.

Note that the information terminal 100 may be configured as, for example, a personal computer, a smart speaker, a television device, or the like, in addition to the above-described smartphone, mobile phone, tablet, or the like.

Furthermore, the input device 106 described above may be configured as an external device separate from the information terminal 100, such as a keyboard or a mouse, and may be connected to the information terminal 100. The display device 107 may be configured as an external device separate from the information terminal 100 and connected to the information terminal 100.

Furthermore, instead of the headphone 200 described above, an earphone, a speaker of a stereo component device, or the like may be connected to the information terminal 100. The number of speakers may be three or more. A plurality of speakers may be integrated with information terminal 100.

As described above, the sound output apparatus 1 can have various hardware configurations.

Figure 2:
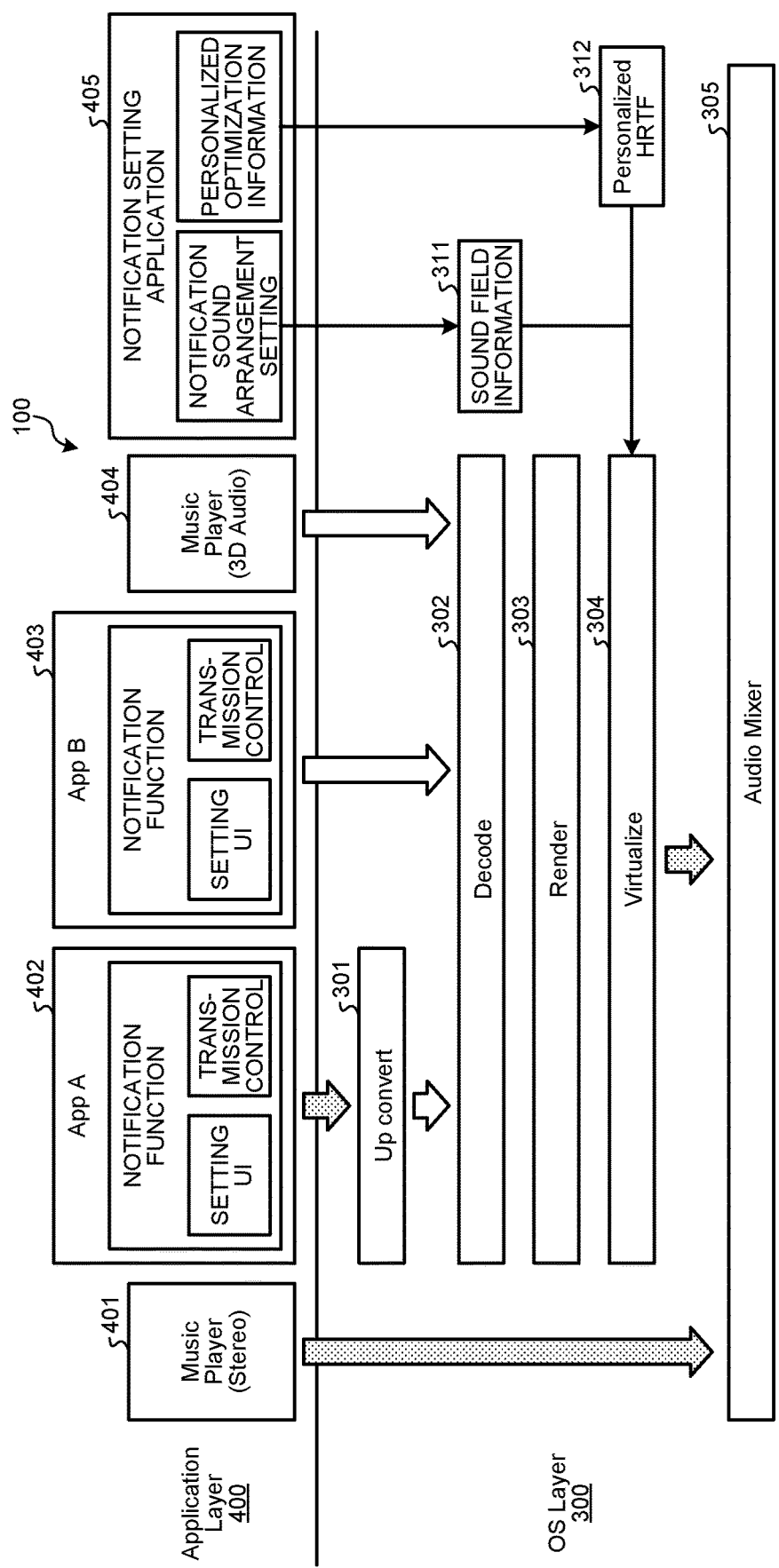
FIG. 2 is a block diagram illustrating an example of a software configuration of an information terminal according to the first embodiment of the present disclosure.

FIG. 2 is a block diagram illustrating an example of a software configuration of the information terminal 100 according to the first embodiment of the present disclosure. As illustrated in FIG. 2, the information terminal 100 includes an application layer 400 and a basic program (OS) layer 300 as a software configuration.

The application layer 400 includes various application programs executed by the information terminal 100. In the example of FIG. 2, examples of the application programs included in the application layer 400 include a music player 401, an A application 402, a B application 403, a music player 404, and a notification setting application 405.

The music player 401 is an application program capable of reproducing music as appreciation content for a two-channel stereo, for example.

The A application 402 is an application program having a setting user interface (UI) that enables various settings of the notification sound by the user and a notification function including a function of transmitting the notification sound. The A application 402 can transmit a notification sound for two-channel stereo, for example.

The B application 403 is an application program having a setting UI that enables various settings of the notification sound by the user and a notification function including a function of transmitting the notification sound. The B application 403 can transmit a notification sound for 3D audio, for example.

The music player 404 is an application program capable of reproducing music as appreciation content for 3D audio, for example.

Note that, for example, an application program for game amusement, an application program for viewing a moving image, and the like may be included in the application layer 400 as an application program capable of reproducing appreciation content other than music. In this case, these application programs may be able to reproduce sound, BGM, sound effects, and the like included in the game and the moving image as the appreciation content.

Furthermore, examples of the notification sound transmitted by the A application 402 and the B application 403 include a notification sound for notifying reception of an email, a message, or the like, a notification sound for notifying an incoming call, a notification sound for notifying that there has been a post on a social networking service (SNS) or the like, a notification sound for notifying that the time set by the user has come, and the like. Examples of the type of the notification sound include a melody, a chime, an alarm sound, and a voice.

Examples of items that the user can set for these notification sounds on the A application 402 and the B application 403 include on/off of the notification sound, selection of the type of the notification sound, and the volume of the notification sound. Even in the same application program, the above setting may be made different depending on the notification content of the notification sound. For this, for example, about the notification sound for notifying reception of an email, there is an example in which the type of the notification sound is made different between the case of an email from a friend and the case of an email from a boss.

The notification setting application 405 is, for example, a standard application program in the above-described basic program 108 (see FIG. 1). The notification setting application 405 is a so-called user interface (UI) that includes a notification sound arrangement setting function and the like, holds personal optimization information and the like, and enables various settings by the user for various notification sounds of the A application 402, the B application 403, and the like.

On the notification setting application 405, the user can perform setting for arranging a desired notification sound at a desired position of the above-described virtual sound field. As a result, the user can adjust the direction, distance, volume, and the like in which each notification sound can be heard. In a case where the volume of the notification sound is also set on the application programs such as the A application 402 and the B application 403, the setting on the notification setting application 405 may be prioritized.

The notification setting application 405 generates sound field information 311 in which positions where various notification sounds sound are arranged in a virtual sound field for the various notification sounds on the basis of the acquired user setting. The sound field information 311 may be a plurality of notification sounds by the same application program or may be generated for each notification sound.

The personalized optimization information includes information for optimizing the arrangement setting in the sound field of the notification sound using the above-described stereophonic sound technology or the like for each user. How the sound reaches the left and right ears of the user varies depending on the individual user, and can be represented by, for example, a head related transfer function (HRTF). The personalized optimization information includes a head-related transfer function optimized for an individual user. The individual user can generate personalized optimization information by optimizing the head-related transfer function by initial setting or the like in the notification setting application 405.

In generating the personalized optimization information, for example, predetermined measurement is performed to optimize the head-related transfer function. As an example of the measurement method, for example, there is a method in which a test sound is output in a predetermined closed environment, and how the test sound sounds to the ears of the user in the closed environment is collected by an ear microphone or the like worn by the user. In addition, the dummy doll on which the ear microphone is mounted may be arranged under various environments, and the test sound output under those environments may be collected.

As described above, for example, the head-related transfer function can be optimized from the sound collection result of the ear microphone mounted on the user or with reference to the sound collection result of the ear microphone mounted on the dummy doll in addition to the sound collection result.

Furthermore, as a more simple measurement method, for example, the head-related transfer function may be optimized by estimation on the basis of captured data of the user's ear captured by the user himself/herself.

In the basic program layer 300, the basic program 108 exerts various functions for collectively processing acoustic data including various notification sounds by various application programs.

For example, the basic program 108 has a function of performing decode processing 302, rendering processing 303, virtualization processing 304, and the like in order to output the notification sound for 3D audio of the B application 403 and the music for 3D audio of the music player 404 as two-channel stereo from the headphone 200.

Here, the virtualization processing 304 is processing of arranging positions where the notification sounds to be transmitted sound in the virtually set sound field on the basis of the user setting.

In addition, the notification sound transmitted by the A application 402 is for two-channel stereo. In order to collectively process the notification sound of the A application 402 together with the notification sound for 3D audio of the B application 403 and the like, the basic program 108 once performs up-conversion processing 301 on the notification sound data of the A application 402, and then performs decode processing 302, rendering processing 303, virtualization processing 304, and the like.

When performing the virtualization processing 304 on the notification sound data of the A application 402 and the B application 403, the basic program 108 performs the virtualization processing 304 using the sound field information 311 corresponding to the notification sound data to be processed among the sound field information 311 generated by the notification setting application 405.

When performing the virtualization processing 304 on the music data or the like of the music player 404, the basic program 108 performs the virtualization processing 304 on the basis of an instruction from the music player 404. As a result, each of the sounds of the plurality of channels included in the music data is arranged at a predetermined position of the sound field.

In any of the virtualization processing 304 of the notification sound data and the music data, the basic program 108 extracts a head-related transfer function (HRTF) 312 optimized for each user from the personalized optimization information held by the notification setting application 405, and performs the virtualization processing 304 so as to conform to each user on the basis of the head-related transfer function 312.

The basic program 108 performs mixing processing 305 for mixing data to be output among the notification sound data of the A application 402 and the B application 403 subjected to the virtualization processing 304, the music data of the music player 404, and the unprocessed music data for the two-channel stereo of the music player 401, and outputs the mixed data.

Figure 3:
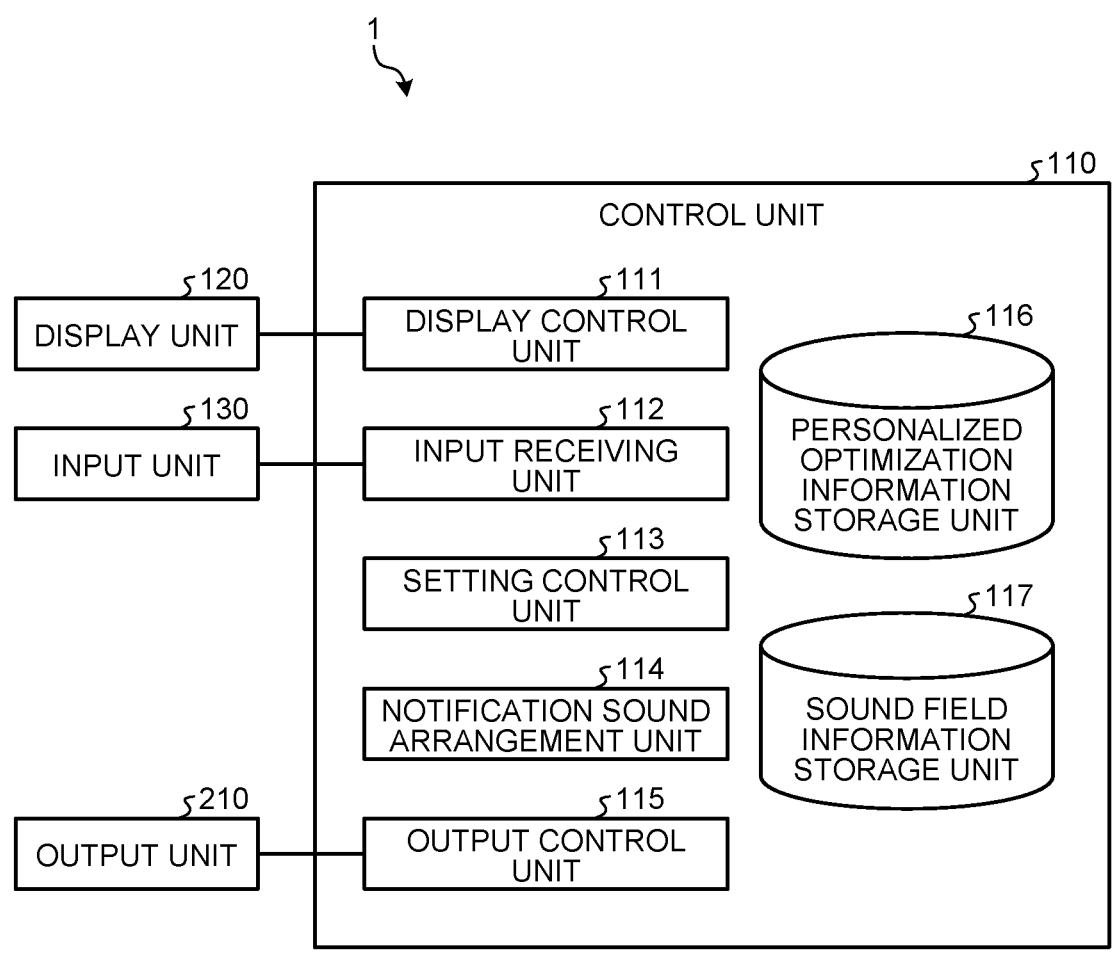
FIG. 3 is a block diagram illustrating an example of a functional configuration of the sound output apparatus according to the first embodiment of the present disclosure.

FIG. 3 is a block diagram illustrating an example of a functional configuration of the sound output apparatus 1 according to the first embodiment of the present disclosure.

As illustrated in FIG. 3, for example, when the CPU 101 of the information terminal 100 executes the basic program 108, the control unit 110 implements, as a functional configuration, a display control unit 111, an input receiving unit 112, a setting control unit 113, a notification sound arrangement unit 114, an output control unit 115, a personalized optimization information storage unit 116, and a sound field information storage unit 117.

The display control unit 111 controls the display unit 120 to display various types of information. The display unit 120 is implemented by, for example, the display device 107 under the control of the CPU 101 that executes the basic program 108.

The input receiving unit 112 controls the input unit 130 to receive inputs of various instructions and the like from the input unit 130 by the user or the like. The input unit 130 is implemented by, for example, the input device 106 under the control of the CPU 101 that executes the basic program 108.

The setting control unit 113 has a UI function that enables various settings by the user for various notification sounds generated according to the application program. The setting control unit 113 generates sound field information on the basis of various settings by the user and stores the sound field information in the sound field information storage unit 117.

The sound field information is generated for each of a plurality of notification sounds, for example, and includes setting information of a position where each notification sound sounds in a virtual sound field. In the sound field information, the position where a predetermined notification sound will sound is represented by, for example, coordinates in the sound field.

The notification sound arrangement unit 114 sets a virtual sound field. The virtual sound field is, for example, a virtual space having a three-dimensional spread centered on the head of the user wearing the headphone 200. In addition, the notification sound arrangement unit 114 arranges positions where various notification sounds sound in the virtual sound field on the basis of the sound field information stored in the sound field information storage unit 117, and generates acoustic data including the notification sound.

At that time, the notification sound arrangement unit 114 adjusts arrangement of various notification sounds on the basis of the personalized optimization information stored in the personalized optimization information storage unit 116. Since the notification sound arrangement unit 114 adjusts the arrangement of the notification sounds in accordance with each individual user on the basis of the personalized optimization information, it is possible to suppress occurrence of an error due to an individual difference in how the set notification sound is heard.

The output control unit 115 causes the output unit 210 to output, for example, a sound including the notification sound on the basis of the acoustic data generated by the notification sound arrangement unit 114. As a result, the user can hear as if the notification sounds sound at different positions in the virtual sound field. The output unit 210 is implemented by, for example, the headphone 200 under the control of the CPU 101 that executes the basic program 108.

The personalized optimization information storage unit 116 stores personalized optimization information.

The sound field information storage unit 117 stores sound field information based on setting by the user such as arrangement of various notification sounds. The sound field information is generated for each of various application programs included in the information terminal 100, for example, and can be stored in the sound field information storage unit 117. Furthermore, the individual sound field information may include setting of arrangement of each of a plurality of notification sounds generated by one application program.

The personalized optimization information storage unit 116 and the sound field information storage unit 117 are implemented by, for example, the storage device 104 under the control of the CPU 101 that executes the basic program 108.

(Function Example of Information Terminal)

Figure 4:
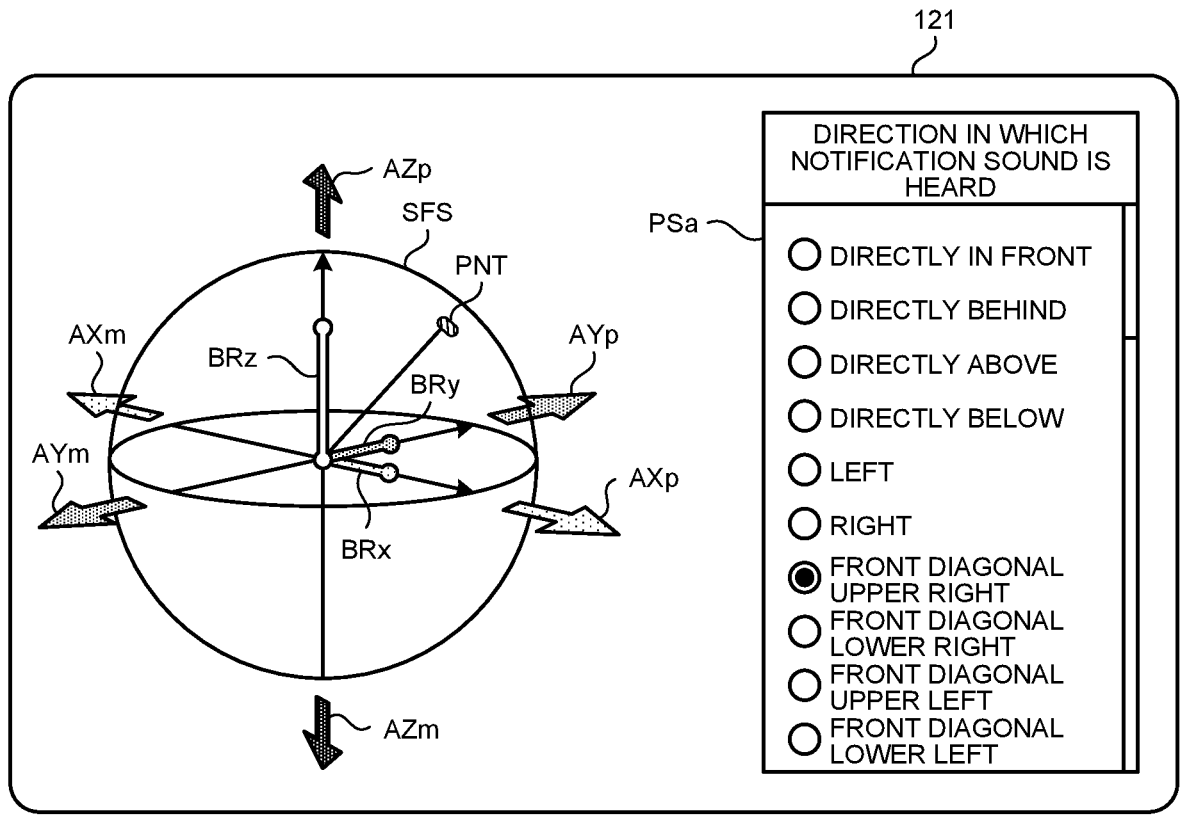
FIG. 4 is a diagram illustrating an example of a setting screen of a notification sound displayed on the information terminal according to the first embodiment of the present disclosure.

Next, the function example of the information terminal 100 according to the first embodiment will be described with reference to FIGS. 4 to 7. FIG. 4 is a diagram illustrating an example of a setting screen 121 of a notification sound displayed on the information terminal 100 according to the first embodiment of the present disclosure.

As illustrated in FIG. 4, for example, the user can start a notification setting application 405 (see FIG. 2) of the information terminal 100 and display a setting screen 121 of a notification sound on the display device 107 of the information terminal 100. The notification setting application 405 enables the user to perform various settings on the notification sound setting screen 121.

The above content can also be described on the basis of the configuration of FIG. 3 described above. When the user inputs an instruction to display the notification sound setting screen 121 from the input unit 130 of the information terminal 100, the input receiving unit 112 included in the control unit 110 of the information terminal 100 receives the instruction of the user. In addition, the display control unit 111 causes the display unit 120 to display the notification sound setting screen 121 according to the instruction of the user received by the input receiving unit 112. The setting control unit 113 enables the user to perform various settings on the notification sound setting screen 121.

On the notification sound setting screen 121, for example, a sphere SFS likened to the sound field set by the notification sound arrangement unit 114 is displayed. In this case, the center of the sphere SFS corresponds to the head position of the user. Furthermore, on the notification sound setting screen 121, a selection screen PSa including, for example, a plurality of preset directions are displayed as a direction in which the user can hear the notification sound. Here, the "direction in which the user can hear the notification sound" on the selection screen PSa is a display in which a position where the notification sound sounds in the sound field is mainly expressed by the user.

The user can select any preset direction for the notification sound that is the current setting target from the selection screen PSa. Furthermore, the user can tap arrows AXp and AXm in the X direction, arrows AYp and AYm in the Y direction, and arrows AZp and AZm in the Z direction around the sphere SFS to finely adjust the direction in which the notification sound can be heard.

In the series of operations by the user, a point PNT indicating a position where the notification sound sounds is displayed in the sphere SFS. In addition, bars BRx, BRy, and BRz indicating the X coordinate, the Y coordinate, and the Z coordinate of the point PNT in the sphere SFS are displayed on the X axis, the Y axis, and the Z axis in the sphere SFS, respectively.

The position of the point PNT moves in accordance with the user's operation, and the lengths of the bars BRx, BRy, and BRz also change. In addition, every time the position of the point PNT is moved by the user's operation, the notification sound sounds at the position in the sound field corresponding to the position of the point PNT in the sphere SFS. As a result, the user can confirm how the user listens when the notification sound has sounded at the set position.

These displays on the notification sound setting screen 121 are controlled by the display control unit 111, for example, on the basis of an instruction of the setting control unit 113. However, the notification sound setting screen 121 displayed on the basis of the instruction of the setting control unit 113 is not limited to the example of FIG. 4. Any display and operation method of the notification sound setting screen may be used as long as the user can visually or intuitively grasp the position where the notification sound sounds in the sound field and assist the setting of the notification sound by the user.

The setting control unit 113 issues a warning by at least one of an alarm, a voice, a message, and the like in a case where the position where the notification sound that is the current setting target sounds is to be set within a predetermined range close to, for example, the setting position of another notification sound that has already been set. As a result, it is possible to suppress a situation in which setting positions of two or more notification sounds in the sound field are too close to each other and the user cannot distinguish these notification sounds from each other.

Furthermore, the setting control unit 113 generates sound field information including setting contents for each of various notification sounds by the user, and stores the sound field information in the sound field information storage unit 117. In the sound field information, positions where various notification sounds sound are represented by, for example, coordinates in the sound field.

Actually, when the notification sound is output from the output unit 210, the notification sound arrangement unit 114 refers to the sound field information of the notification sound to be output and arranges the position where the notification sound sounds in the virtual sound field. In addition, the notification sound arrangement unit 114 adjusts the position where the notification sound sounds so as to conform to the user who has set the notification sound on the basis of the personalized optimization information stored in the personalized optimization information storage unit 116.

Figure 5:
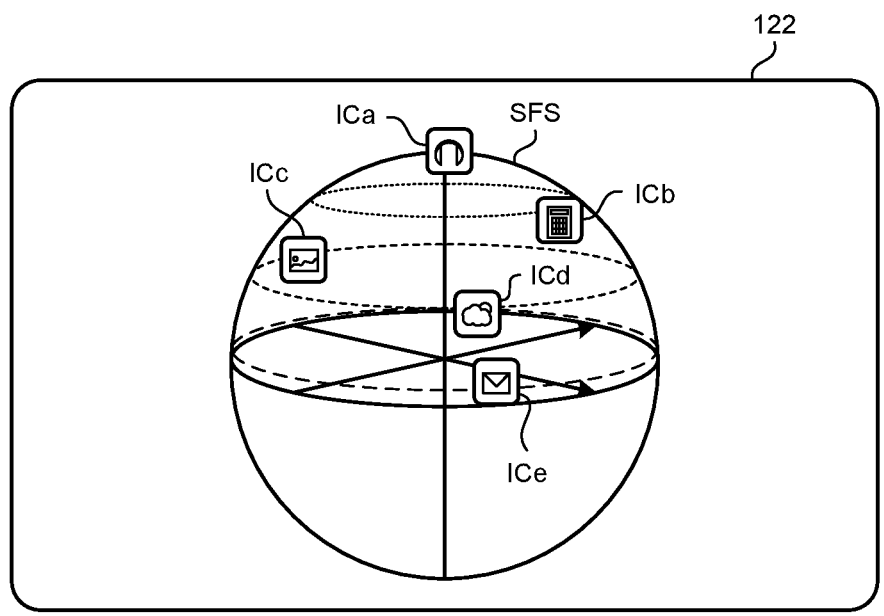
FIG. 5 is a diagram illustrating an example of a confirmation screen of the notification sound displayed on the information terminal according to the first embodiment of the present disclosure.

The user can also confirm the set positions of the plurality of notification sounds in the sound field set as described above on the notification setting application 405. FIG. 5 is a diagram illustrating an example of a confirmation screen 122 of a notification sound displayed on the information terminal 100 according to the first embodiment of the present disclosure.

As illustrated in FIG. 5, the notification setting application 405 causes the display device 107 of the information terminal 100 to display a notification sound confirmation screen 122 in accordance with an instruction from the user. In other words, when the user inputs an instruction to display the notification sound confirmation screen 122 from the input unit 130 of the information terminal 100, the input receiving unit 112 included in the control unit 110 of the information terminal 100 receives the user's instruction. In addition, the display control unit 111 causes the display unit 120 to display the notification sound confirmation screen 122 in accordance with the user's instruction received by the input receiving unit 112.

On the notification sound confirmation screen 122, for example, a sphere SFS likened to a sound field set by the notification sound arrangement unit 114 is displayed. In the sphere SFS, for example, icons ICa to ICe of application programs corresponding to various notification sounds are displayed at positions where the notification sounds sound. The display positions of these icons ICa to ICe are determined by the display control unit 111, for example, on the basis of information acquired by the setting control unit 113 from a plurality of pieces of sound field information of the sound field information storage unit 117.

With such a notification sound confirmation screen 122, the user can visually confirm a correspondence relationship of positions where various notification sounds sound in the sound field. Therefore, it is possible to confirm whether there is a notification sound that is difficult to distinguish due to overlapping with each other also from the notification sound confirmation screen 122.

However, the notification sound confirmation screen 122 is not limited to the example of FIG. 5. The display of the notification sound confirmation screen may be any display as long as the user can visually or intuitively grasp the positional relationship of the plurality of notification sounds in the sound field.

Incidentally, the notification sound arrangement unit 114 may be capable of not only statically arranging the positions where various notification sounds sound in the sound field but also dynamically arranging the positions. When the positions where the notification sounds sound in the sound field are dynamically arranged, the user can hear as if the notification sounds are being sounded while moving in the sound field. In terms of ergonomics, it is said that the recognizability is further enhanced for a moving object. The function of dynamically arranging the notification sounds is based on such a theory.

Figure 6:
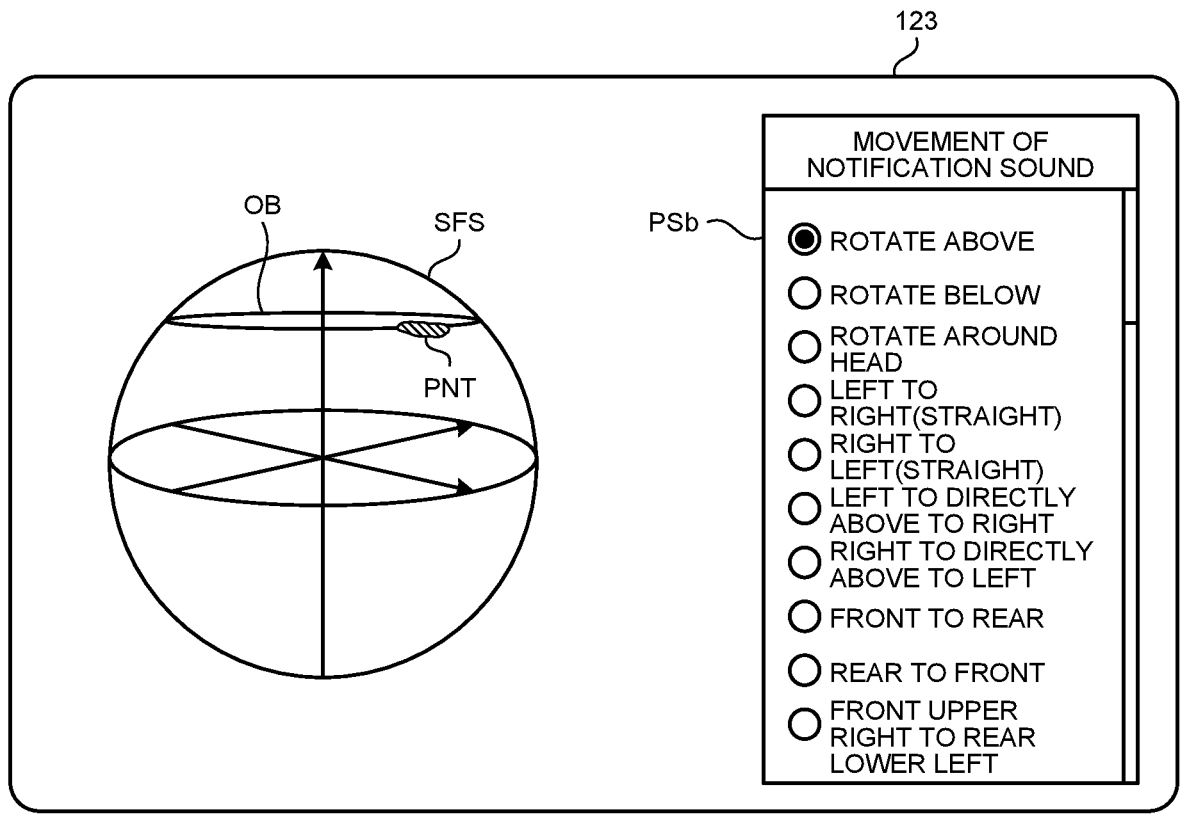
FIG. 6 is a diagram illustrating another example of the setting screen of the notification sound displayed on the information terminal according to the first embodiment of the present disclosure.

FIG. 6 is a diagram illustrating another example of the notification sound setting screen 123 displayed on the information terminal 100 according to the first embodiment of the present disclosure. On the notification sound setting screen 123 illustrated in FIG. 6, the setting control unit 113 enables the user to perform setting for dynamically arranging the positions where various notification sounds sound.

As illustrated in FIG. 6, on the notification sound setting screen 123, for example, a sphere SFS likened to a sound field set by the notification sound arrangement unit 114 is displayed. Furthermore, on the notification sound setting screen 123, a selection screen PSb including, for example, a plurality of preset movements are displayed as the movement of the notification sound that can be heard by the user.

The user can select any preset movement for the notification sound that is the current setting target from the selection screen PSb. When the user selects one of the movements, a trajectory OB indicating the movement of the position where the notification sound sounds is displayed. A point PNT is also displayed on the trajectory OB. In addition, the notification sound sounds while moving in the sound field so as to correspond to the trajectory OBB in the sphere SFS. As a result, the user can confirm how the user listens when the notification sound has sounded by the set movement.

These displays on the notification sound setting screen 123 are controlled by the display control unit 111, for example, on the basis of an instruction of the setting control unit 113. However, the notification sound setting screen 123 displayed on the basis of the instruction of the setting control unit 113 is not limited to the example of FIG. 6. Any display and operation method of the notification sound setting screen may be used as long as the user can visually or intuitively grasp the movement of the position where the notification sound sounds in the sound field and assist the setting of the notification sound by the user.

The setting control unit 113 issues a warning by at least one of an alarm, a voice, a message, and the like, for example, in a case where the movement of the position where the notification sound that is the current setting target sounds is to be set to overlap with another notification sound that has already been set. As a result, it is possible to suppress a situation in which the trajectories of two or more notification sounds in the sound field overlap each other and the user cannot distinguish these notification sounds from each other.

Furthermore, the setting control unit 113 generates sound field information including setting contents for each of various notification sounds by the user, and stores the sound field information in the sound field information storage unit 117. In the sound field information, the trajectories of the various notification sounds are represented by, for example, coordinates in the sound field.

Actually, when the notification sound is output from the output unit 210, the notification sound arrangement unit 114 refers to the sound field information of the notification sound to be output and arranges the trajectory of the position where the notification sound sounds in the virtual sound field. In addition, the notification sound arrangement unit 114 adjusts the trajectory of the position where the notification sound sounds so as to conform to the user who has set the notification sound on the basis of the personalized optimization information stored in the personalized optimization information storage unit 116.

Figure 7:
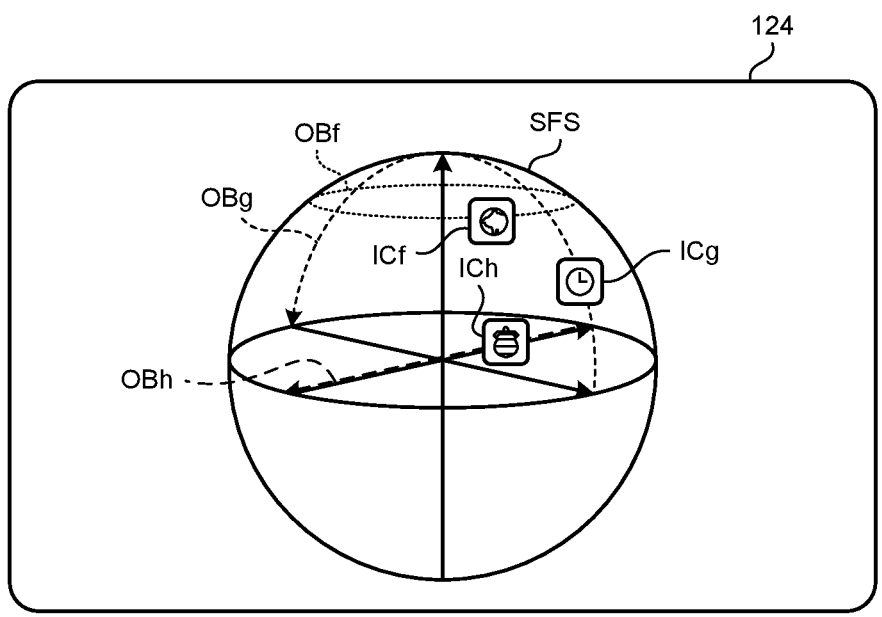
FIG. 7 is a diagram illustrating another example of the confirmation screen of the notification sound displayed on the information terminal according to the first embodiment of the present disclosure.

The user can also confirm the trajectories of the plurality of notification sounds in the sound field set as described above on the notification setting application 405. FIG. 7 is a diagram illustrating another example of a notification sound confirmation screen 124 displayed on the information terminal 100 according to the first embodiment of the present disclosure.

As illustrated in FIG. 7, the notification setting application 405 causes the display device 107 of the information terminal 100 to display a notification sound confirmation screen 124 in accordance with an instruction from the user. In other words, when the user inputs an instruction to display the notification sound confirmation screen 122 from the input unit 130 of the information terminal 100, the input receiving unit 112 included in the control unit 110 of the information terminal 100 receives the user's instruction. In addition, the display control unit 111 causes the display unit 120 to display the notification sound confirmation screen 122 in accordance with the user's instruction received by the input receiving unit 112.

On the notification sound confirmation screen 124, for example, a sphere SFS likened to a sound field set by the notification sound arrangement unit 114 is displayed. In the sphere SFS, for example, icons ICf to ICh of application programs corresponding to various notification sounds are displayed on trajectories OBf to OBh indicating movement of positions where the notification sounds sound. The display positions of the trajectories OBf to OBh and the icons ICf to ICh are determined by the display control unit 111, for example, on the basis of information acquired by the setting control unit 113 from a plurality of pieces of sound field information in the sound field information storage unit 117.

With such a notification sound confirmation screen 124, the user can visually confirm the correspondence relationship of the trajectories of various notification sounds in the sound field. Therefore, also from the notification sound confirmation screen 124, it is possible to confirm whether there is a notification sound that is difficult to hear due to overlapping of trajectories.

However, the notification sound confirmation screen 124 is not limited to the example of FIG. 7. The display of the notification sound confirmation screen may be any display as long as the user can visually or intuitively grasp the positional relationship of the trajectories in the sound field of the plurality of notification sounds.

(Processing Example by Information Terminal)

Figure 8:
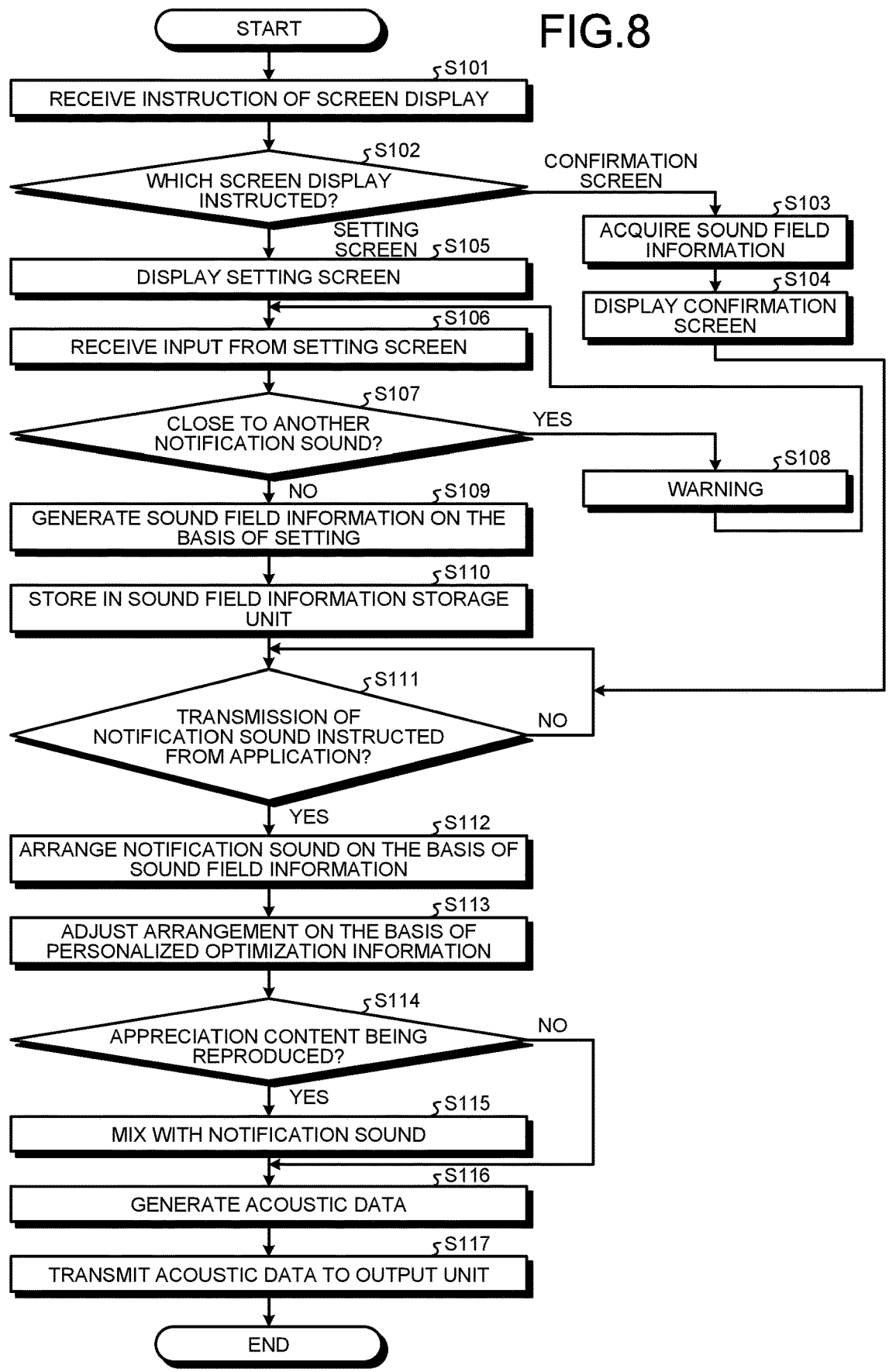
FIG. 8 is a flowchart illustrating an example of a procedure of processing by the information terminal according to the first embodiment of the present disclosure.

Next, a processing example by the information terminal 100 according to the first embodiment will be described with reference to FIG. 8. FIG. 8 is a flowchart illustrating an example of a procedure of processing by the information terminal 100 according to the first embodiment of the present disclosure. Note that, in the processing illustrated in FIG. 8, it is assumed that personalized optimization information is stored in advance in the personalized optimization information storage unit 116 of the information terminal 100.

As illustrated in FIG. 8, when the user inputs an instruction to display the setting screen or the confirmation screen of the notification sound from the input unit 130 of the information terminal 100, the input receiving unit 112 receives the instruction from the user (step S101).

When the instruction received by the input receiving unit 112 is the display instruction of the notification sound confirmation screen (step S102: confirmation screen), the setting control unit 113 acquires the sound field information for each notification sound from the sound field information storage unit 117 (step S103).

The setting control unit 113 instructs the display control unit 111 to display a confirmation screen indicating the position of the already set notification sound on the basis of the acquired sound field information. The display control unit 111 causes the display unit 120 to display the notification sound confirmation screen in accordance with the instruction from the setting control unit 113 (step S104).

When the instruction received by the input receiving unit 112 is a display instruction of a notification sound setting screen (step S102: setting screen), the display control unit 111 causes the display unit 120 to display the notification sound setting screen (step S105).

When the user performs various settings on the notification sound setting screen, the input receiving unit 112 receives various settings by the user (step S106). At this time, the setting control unit 113 instructs the display control unit 111 to change the setting screen corresponding to various operations of the user from the input unit 130. In accordance with an instruction from the setting control unit 113, the display control unit 111 controls the display unit 120 so that a screen corresponding to various operations of the user is displayed.

The setting control unit 113 determines whether the position, trajectory, or the like that the user intends to set for the notification sound to be set is close to the position, trajectory, or the like of another notification sound that has already been set (step S107). If the position, trajectory, or the like that the user intends to set is not close to another notification sound within the predetermined range (step S107: No), the setting control unit 113 advances the processing to step S109.

In a case where the position, trajectory, or the like that the user intends to set is close to another notification sound within the predetermined range (step S107: Yes), the setting control unit 113 issues a warning by an alarm, a voice, a message, or the like (step S108), and causes the user to reinput the setting (step S106).

The setting control unit 113 generates sound field information including a sound position, a trajectory, or the like of the notification sound to be set in the virtual sound field on the basis of the setting content from the user received by the input receiving unit 112 (step S109). The setting control unit 113 stores the generated sound field information in the sound field information storage unit 117 (step S110).

The notification sound arrangement unit 114 determines whether or not there is an instruction to transmit a notification sound having a predetermined content from any of the application programs (step S111). When there is no instruction to transmit the notification sound from any of the application programs (step S111: No), the notification sound arrangement unit 114 waits for the instruction to transmit the notification sound from the application program.

In a case where there is an instruction to transmit the notification sound from any of the application programs (step S111: Yes), the notification sound arrangement unit 114 refers to the sound field information storage unit 117 and arranges the notification sound to be transmitted in the sound field on the basis of the sound field information of the notification sound for which the transmission instruction has been received (step S112).

The notification sound arrangement unit 114 refers to the personalized optimization information storage unit 116, and adjusts the position of the notification sound in the sound field so as to conform to the user on the basis of the personalized optimization information of the user who has set the notification sound (step S113).

If the appreciation content such as music by the music player 404 (see FIG. 2) or the like is being reproduced (step S114: Yes), the notification sound arrangement unit 114 mixes the data of the notification sound arranged in the sound field and the data of the appreciation content (step S115), and if not being reproduced (step S114: No), generates the acoustic data using only the data of the notification sound (step S116).

The notification sound arrangement unit 114 passes the generated acoustic data to the output control unit 115, and the output control unit 115 transmits the acoustic data from the notification sound arrangement unit 114 to the output unit 210 and causes the output unit to output the acoustic data (step S117).

As described above, the processing by the information terminal 100 of the first embodiment ends.

Overview

When a user attaches a headphone to an information terminal such as a smartphone and listens to appreciation content such as music, the user is often not looking at a screen of the information terminal. Therefore, various application programs prepare various notification sounds. However, if the notification sound is mixed with the appreciation content such as music, it is difficult to recognize the notification sound, and the notification sound may be missed. In addition, since a plurality of notification sounds are used for each application program or for each notification content, it may be difficult to distinguish the notification sounds without confirming the screen of the information terminal.

In recent years, it has also been proposed to use stereophonic sound technology or the like for reproducing appreciation content such as music. For this reason, there is a sense of spreading in the sound in the appreciation content, and even if the notification sound is sounded during reproduction of the appreciation content, the notification sound is easily blended into the sound of the appreciation content, and the problem of how to enhance the recognizability of the notification sound tends to be easily revealed.

According to the information terminal 100 of the first embodiment, the positions where the plurality of notification sounds sound in the virtual sound field are arranged to be different for each of the plurality of notification sounds. As a result, for example, even in a case where the notification sound is mixed with the appreciation content, it is possible to impart a performance effect to the notification sound sounded through the headphone or the like, and it is possible to enhance the recognizability of the notification sound. Therefore, it is possible to prevent the notification sound from being missed. In addition, it is easy to distinguish a plurality of notification sounds sounded for each application program or for each notification content without confirming the screen of the information terminal 100.

According to the information terminal 100 of the first embodiment, positions where at least one of a plurality of notification sounds sounds in a sound field are dynamically arranged. The notification sound for which the positions sounded in the sound field are dynamically arranged is output from the headphone 200 as if the notification sound is sounded while moving in the sound field. As a result, the performance effect of the notification sound sounded through the headphone 200 is further enhanced, and the recognizability of the notification sound can be further enhanced.

The information terminal 100 according to the first embodiment includes a setting control unit that causes a user to set positions where a plurality of notification sounds sound in a sound field. As a result, the user can arrange a desired notification sound at desired positions in the virtual sound field.

According to the information terminal 100 of the first embodiment, the user is caused to select preset positions as the positions where the plurality of notification sounds sound in the sound field. As a result, the burden on the user is reduced, and the user can easily perform setting on the notification sound.

According to the information terminal 100 of the first embodiment, the user finely adjusts the positions where the plurality of notification sounds sound in the sound field from the preset positions. As a result, the usability of the notification sound setting screen 121,123 is improved, and the user can perform setting more suitable for the request.

According to the information terminal 100 of the first embodiment, a warning is issued when the positions where a plurality of notification sounds sound in the sound field are set close to each other within a predetermined range. As a result, it is possible to suppress occurrence of an inconvenience that the positions where the plurality of notification sounds sound are too close to each other in the sound field and the notification sounds cannot be distinguished from each other. Therefore, it is possible to appropriately assist the user, and usability is improved.

According to the information terminal 100 of the first embodiment, the user collectively sets the positions where the plurality of notification sounds respectively transmitted by the plurality of application programs sound in the sound field. This enables versatile setting for a plurality of application programs. In addition, for example, complicated work such as setting for each of a plurality of application programs becomes unnecessary, and usability can be improved.

According to the information terminal 100 of the first embodiment, the point PNT indicating the position where notification sounds to be set sound in the sphere SFS likened to the sound field is displayed on the notification sound setting screen 121 according to the setting by the user. In addition, on the notification sound setting screen 123, a trajectory OB in which the position where the notification sound to be set sounds moves in the sphere SFS likened to the sound field is displayed according to the setting by the user.

In this manner, by graphically displaying the setting screen 121, 123, the user can intuitively or visually grasp the position or trajectory where the notification sound to be set sounds. In addition, since the information terminal 100 collectively performs the processing for the notification sound, it is possible to set various notification sounds of various application programs on the common setting screen 121, 123, and it is possible to unify the setting forms of various notification sounds. Therefore, setting by the user can be strongly assisted, and usability can be improved.

According to the information terminal 100 of the first embodiment, the icons ICa to ICe indicating the respective positions where the plurality of notification sounds sound are arranged on the notification sound confirmation screen 122 in the sphere SFS likened to the sound field according to the setting by the user. In addition, on the notification sound confirmation screen 124, each of the trajectories OBf to OBh in which the positions where the plurality of notification sounds sound move in the sphere SFS likened to the sound field is arranged according to the setting by the user.

In this manner, by graphically displaying the confirmation screen 122, 124, the user can intuitively or visually grasp the position or trajectory where the notification sounds to be set sound, and it is possible to assist the user so that the notification sounds can be prevented from approaching or overlapping each other. In addition, since the information terminal 100 collectively performs processing for the notification sound, various notification sounds of various application programs can be collectively displayed on the confirmation screen 122, 124, and it is easy to compare setting contents for individual notification sounds.

According to the information terminal 100 of the first embodiment, the positions where the plurality of notification sounds sound in the sound field are arranged on the basis of the personalized optimization information in which the head-related transfer function is adjusted for the user. As a result, it is possible to reduce an error in how the individual user listens to the notification sound and to arrange, in the sound field, the positions where the notification sounds sound as if the notification sounds sound at the positions and trajectories designated by the user. In addition, since the information of the head-related transfer function optimized for the individual user is shared by all the application programs, it is possible to suppress variation for each application program or for each notification sound, to reproduce a plurality of notification sounds with high accuracy, and to further improve the recognizability of the notification sound by the user.

Note that, in the first embodiment described above, the basic program 108 such as the OS collectively performs the processing of arranging the positions and the like of the notification sounds in the sound field across various application programs. However, not only the basic program 108 but also, for example, an application program such as an audio driver can be used to implement batch processing for the notification sound. As described above, the basic program 108 described above is merely an example, and the type, method, and the like of the program for performing batch processing on the notification sound are not limited.

(First Modification)

Figure 9:
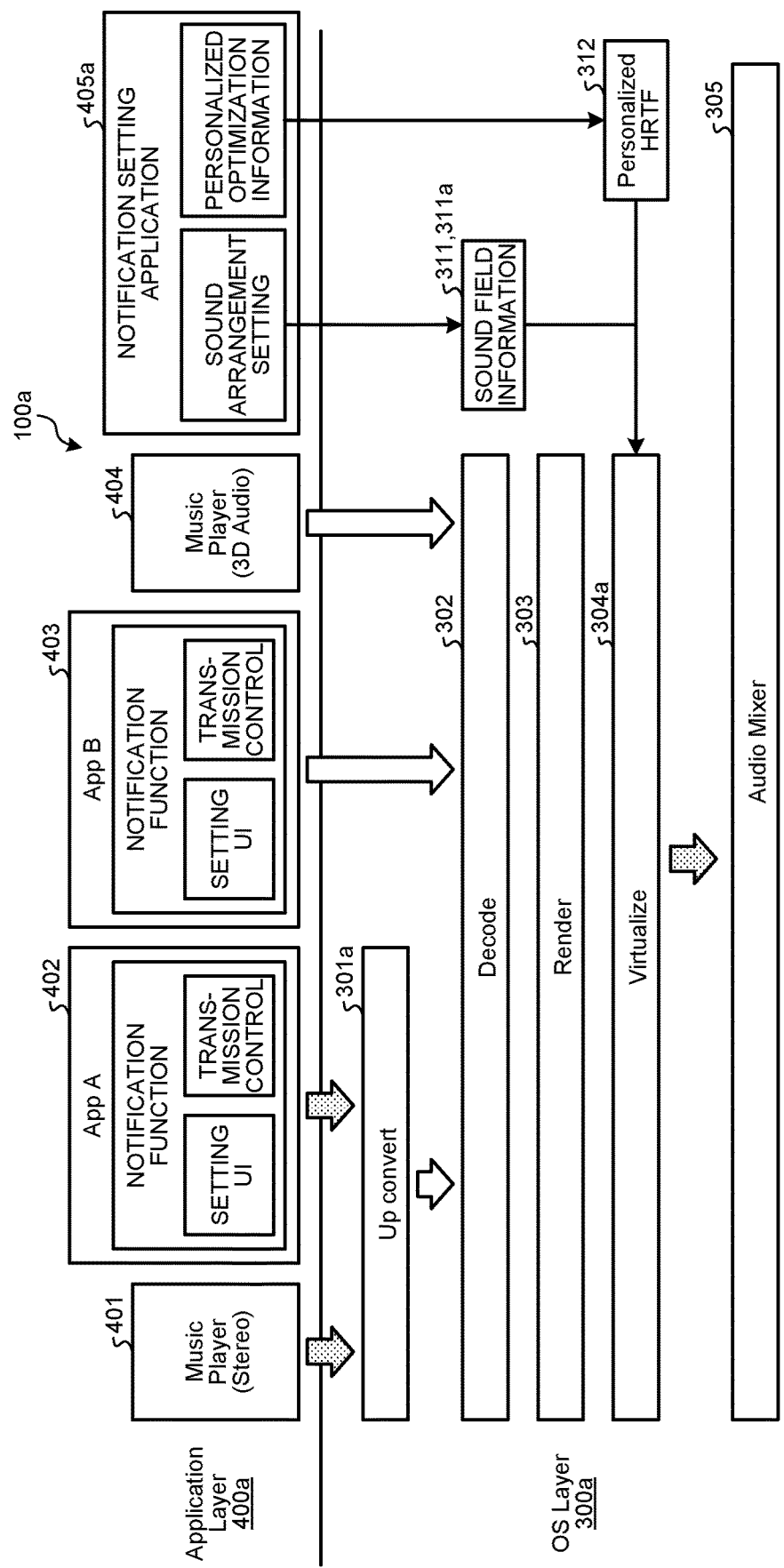
FIG. 9 is a block diagram illustrating an example of a software configuration of an information terminal according to a first modification of the first embodiment of the present disclosure.

Next, an information terminal 100a according to a first modification of the first embodiment will be described with reference to FIG. 9. FIG. 9 is a block diagram illustrating an example of a software configuration of an information terminal 100a according to the first modification of the first embodiment of the present disclosure. The information terminal 100a of the first modification is different from that of the first embodiment in that the reproduction position of the appreciation content is moved in the sound field.

As illustrated in FIG. 9, the information terminal 100a includes, as a software configuration, an application layer 400a and a basic program (OS) layer 300a.

In the example of FIG. 9, the application layer 400a includes, for example, application programs such as the music player 401, the A application 402, the B application 403, the music player 404, and the notification setting application 405a. Among these, the application programs other than the notification setting application 405a are similar to the application programs exemplified in the above-described first embodiment.

The notification setting application 405a is, for example, a standard application program in a basic program included in the information terminal 100a of the first modification. The notification setting application 405a is a user interface (UI) that has a sound arrangement setting function and the like, holds personalized optimization information and the like, and enables the user to perform various settings for various sounds including the notification sound.

According to the sound arrangement setting function of the notification setting application 405a, not only the positions where various notification sounds sound in the sound field can be arranged, but also the position where the appreciation content such as music is reproduced in the sound field can be moved.

On the notification setting application 405a, the user can perform setting to arrange desired notification sounds at desired positions in the sound field. Furthermore, in a case where the notification sound sounds while the appreciation content is being reproduced, the user can make a setting to temporarily move the reproduction position of the appreciation content being reproduced in the sound field. As a result, when the notification sound is sounded, the user can reproduce the appreciation content in a different direction, distance, volume, and the like from those in the past.

The notification setting application 405a respectively generates pieces of sound field information 311 indicating positions where the notification sound of the A application 402 and the notification sound of the B application 403 sound in the virtual sound field on the basis of various settings by the user acquired by the notification setting application 405a.

In addition, the notification setting application 405a respectively generates pieces of sound field information 311a indicating moving positions of the music of the music player 401 and the music of the music player 404 in the virtual sound field on the basis of various settings by the user acquired by the notification setting application 405a.

In the basic program layer 300a, the basic program of the first modification exerts various functions for collectively processing various types of acoustic data by various application programs.

At this time, the basic program of the first modification collectively processes the notification sound for two-channel stereo transmitted by the A application 402 and the notification sound for 3D audio transmitted by the B application 403, similarly to the case of the above-described first embodiment.

In addition, the basic program of the first modification is preferably configured to be able to collectively perform the processing of the music for the two-channel stereo reproduced by the music player 401 together with the processing of the music for the 3D audio reproduced by the music player 404.

That is, the basic program of the first modification performs up-conversion processing 301a on the music data of the music player 401 and the notification sound data of the A application 402.

Furthermore, the basic program of the first modification performs the decode processing 302, the rendering processing 303, the virtualization processing 304a, and the like on the up-converted music data of the music player 401 and the music data of the music player 404, the up-converted notification sound data of the A application 402, the notification sound data of the B application 403, and the like.

When performing the virtualization processing 304a on the notification sound data of the A application 402 and the B application 403, the basic program of the first modification performs the virtualization processing 304a using the sound field information 311 corresponding to the notification sound data to be processed among the sound field information 311 generated by the notification setting application 405a.

When performing the virtualization processing 304a on the music data or the like of the music player 401, 404, the basic program of the first modification performs the virtualization processing 304a on the basis of an instruction of the music player 401, 404. As a result, each of the sounds of the two channels included in the music data of the music player 401 is arranged at a predetermined position of the sound field spreading to the left and right. In addition, each of the sounds of the plurality of channels included in the music data of the music player 404 is arranged at a predetermined position of the sound field spreading three-dimensionally.

In a case where a notification sound of at least one of the A application 402 and the B application 403 is sounded during reproduction of the music of at least one of the music players 401 and 404, the basic program of the first modification performs the virtualization processing 304a using the sound field information 311a corresponding to the music data to be processed among the pieces of the sound field information 311a generated by the notification setting application 405a. Furthermore, the basic program of the first modification performs the virtualization processing 304a using the sound field information 311 corresponding to the notification sound data to be processed among the pieces of the sound field information 311 generated by the notification setting application 405a.

In any of the virtualization processing 304a, the basic program of the first modification extracts the head-related transfer function (HRTF) 312 optimized for each user from the personalized optimization information held by the notification setting application 405a, and performs the virtualization processing 304a to suit each user on the basis of the head-related transfer function 312.

The basic program of the first modification performs mixing processing 305 of mixing data to be output among the pieces of the notification sound data of the A application 402 and the B application 403 on which the virtualization processing 304 a has been performed and the music data of the music player 401, 404, and outputs the mixed data.

As described above, the user can set how to move the reproduction position of the appreciation content when the notification sound sounds during reproduction of the appreciation content such as music. The movement of the reproduction position of the appreciated content as described above will be specifically exemplified below.

As an example of a case where music for 3D audio is reproduced, for example, it is possible to temporarily move the reproduction position of the appreciation content such that the appreciation content that has been spread and heard in the entire sound field so as to surround the head of the user can be heard from, for example, only one point in a predetermined direction with reference to the head of the user at the timing when the notification sound sounds. At this time, the volume of the appreciation content may be lowered. When the notification sound stops, the reproduction position and the volume of the appreciation content return to the original state.

As an example of a case where the music for two-channel stereo is reproduced, for example, it is possible to move the reproduction position of the appreciation content so that the appreciation content that has been spread and heard in the sound field extending to the left and right of the head of the user can be heard from only one of the left and right directions with reference to the head of the user at the timing when the notification sound sounds. At this time, the volume of the appreciation content may be lowered. When the notification sound stops, the reproduction position and the volume of the appreciation content return to the original state.

Note that, in the setting of moving the reproduction position of the appreciation content, for example, the movement setting of the reproduction position of the appreciation content may be performed at a position opposite to the position where the notification sound to be transmitted sounds. That is, for example, in a case where the notification sound is set to be heard from the left side of the user, the destination of the reproduction position of the appreciation content is set to the right side of the user. Furthermore, for example, in a case where the notification sound is set to be heard from above the line of sight of the user, the destination of the reproduction position of the appreciation content is set below the line of sight of the user.

As a result, at the timing when the notification sound sounds, for the user, the notification sound is heard as if the reproduction position of the appreciation content moves away from the position where the notification sound sounds.

Furthermore, in any of the above cases, the notification sound itself may sound from one point in the sound field by being statically arranged at a predetermined position in the sound field, or may sound while moving in the sound field by being dynamically arranged in the sound field.

Note that, it can also be understood that the CPU of the information terminal 100a executes the basic program of the first modification, for example, so that the above-described functions are implemented by the display control unit, the input receiving unit, the setting control unit, the notification sound arrangement unit, the output control unit, the personalized optimization information storage unit, and the sound field information storage unit corresponding to the above-described first embodiment, and the above-described various processing are performed.

According to the information terminal 100a of the first modification, in a case where at least one of a plurality of notification sounds is sounded when the appreciation content is output from the output unit, a position where the appreciation content sounds in the sound field is moved. As a result, the degree of separation between the appreciation content that the user is appreciating and the notification sound suddenly transmitted is increased, and the recognizability of the notification sound can be further enhanced.

(Second Modification)

Next, an information terminal according to a second modification of the first embodiment will be described. In the information terminal of the second modification, the function of arranging the position where the notification sound sounds at a predetermined position in the sound field is applied to a route guidance application.

In the information terminal of the second modification, a route guidance application program having a function of guiding a route or a travel route using public transportation or the like is executed. The route guidance application program transmits a route guidance voice as a notification sound. The voice of the route guidance indicates the traveling direction, the point where the vehicle turns right or left, and the direction by, for example, north, south, east, and west.

The basic program of the second modification processes the voice of the route guide, and arranges the position where the voice sounds at the position corresponding to the guide content in the sound field. That is, the basic program of the second modification makes the direction in which the voice can be heard and the direction in which the voice guides coincide with each other. As a result, the user feels as if the voice of the route guide is heard from the direction to proceed.

Note that the arrangement of the route guidance voice in the sound field in the information terminal of the second modification may be set by default or may be configured to be settable by the user. In this case, when the CPU of the information terminal of the second modification executes, for example, the basic program of the second modification, the above-described functions may be implemented by the display control unit, the input receiving unit, the setting control unit, the notification sound arrangement unit, the output control unit, the personalized optimization information storage unit, and the sound field information storage unit corresponding to the above-described first embodiment, and the above-described various processing may be performed.

According to the information terminal of the second modification, the position where the route guide voice sounds is made to coincide with the direction in which the voice guides. As a result, even in a case where the user is guided to an unfamiliar place, for example, north, south, east, and west, the user can know the direction to proceed without confirming the screen of the information terminal.

(Third Modification)

Figure 10:
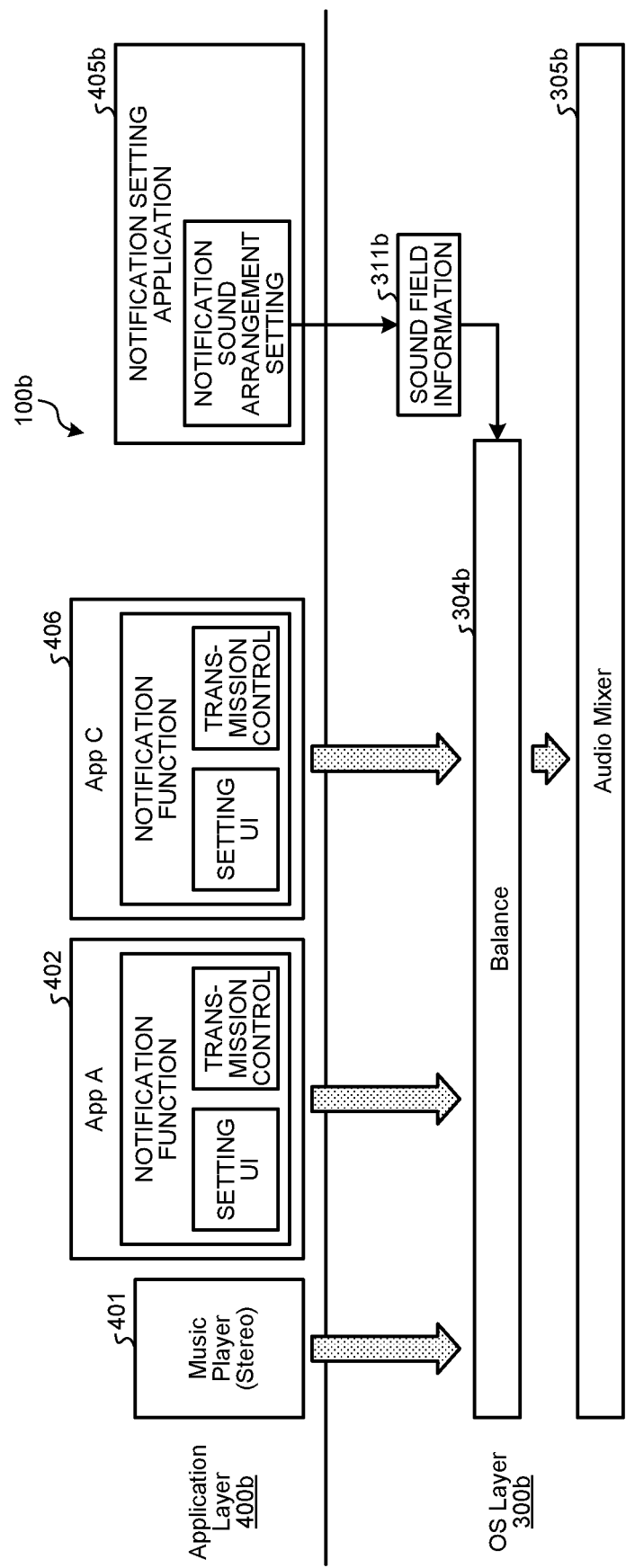
FIG. 10 is a block diagram illustrating an example of a software configuration of an information terminal according to a third modification of the first embodiment of the present disclosure.

Next, an information terminal 100b according to a third modification of the first embodiment will be described with reference to FIG. 10. FIG. 10 is a block diagram illustrating an example of a software configuration of the information terminal 100b according to the third modification of the first embodiment of the present disclosure. The information terminal 100b of the third modification is different from that of the first embodiment described above in that a position where a notification sound sounds is arranged in a sound field extending to the left and right.

As illustrated in FIG. 10, the information terminal 100b includes, as a software configuration, an application layer 400b and a basic program (OS) layer 300b.

In the example of FIG. 10, the application layer 400b includes, for example, a music player 401, an A application 402, a C application 406, a notification setting application 405b, and the like as various application programs executed by the information terminal 100b. Among them, the music player 401 and the A application 402 are similar to the application program exemplified in the above-described first embodiment.

The C application 406 is an application program having a setting UI that enables the user to turn on/off the notification sound, select a type of the notification sound, and set various types of volume of the notification sound, and a notification function including a function of transmitting the notification sound for two-channel stereo.

The notification setting application 405b is, for example, a standard application program in a basic program included in the information terminal 100b. The notification setting application 405b includes a notification sound arrangement setting function and the like, and is a user interface (UI) that enables the user to perform various settings for various notification sounds of the A application 402 and the C application 406.

In the basic program layer 300b, the basic program of the third modification performs balance processing 304b on the acoustic data including various notification sounds by various application programs. The balance processing 304b is processing of arranging a position where a notification sound or the like sounds by adjusting the left-right balance in the sound field spreading to the left and right.

In the balance processing 304b, the basic program of the third modification arranges the position where the notification sound sounds using, for example, a two-channel stereo technology. In this case, the basic program of the third modification sets a sound field spreading in the left-right direction with reference to the head of the user and adjusts the left-right balance, thereby arranging a position where the notification sound sounds in the sound field. At this time, the position where the notification sound sounds in the sound field in the left-right direction may be statically or dynamically arranged.

Furthermore, the sound field information 311b used at this time is generated on the basis of user setting, and the position where the notification sound sounds in the sound field spreading in the left-right direction is represented by coordinates or the like.

In addition, the basic program of the third modification may collectively perform the balance processing 304b on the music data of the music player 401 and the like, for example, similarly to the notification sound data of the A application 402 and the C application 406. In this case, the basic program of the third modification performs the balance processing 304b for adjusting the left-right balance in the sound field spreading in the left-right direction on the basis of the instruction of the music player 401.

The basic program of the third modification performs mixing processing 305b for mixing data to be output among the notification sound data of the A application 402 and the C application 406 on which the balance processing 304b has been performed and the music data of the music player 401, and outputs the mixed data.

By setting and outputting various notification sounds in this manner, for the user, the notification sounds are heard as if the notification sounds sound at different distances and different volumes from one of the left and right directions.

Note that it can also be understood that the CPU of the information terminal 100b executes, for example, the basic program of the third modification, so that the above-described functions are implemented by the display control unit, the input receiving unit, the setting control unit, the notification sound arrangement unit, the output control unit, and the sound field information storage unit corresponding to the above-described first embodiment, and the above-described various processing are performed.

Second Embodiment

A second embodiment will be described with reference to the drawings. The information terminal of the second embodiment is different from the first embodiment described above in that each application program has a function of arranging a position where a notification sound sounds at a predetermined position in a sound field.

Figure 11:
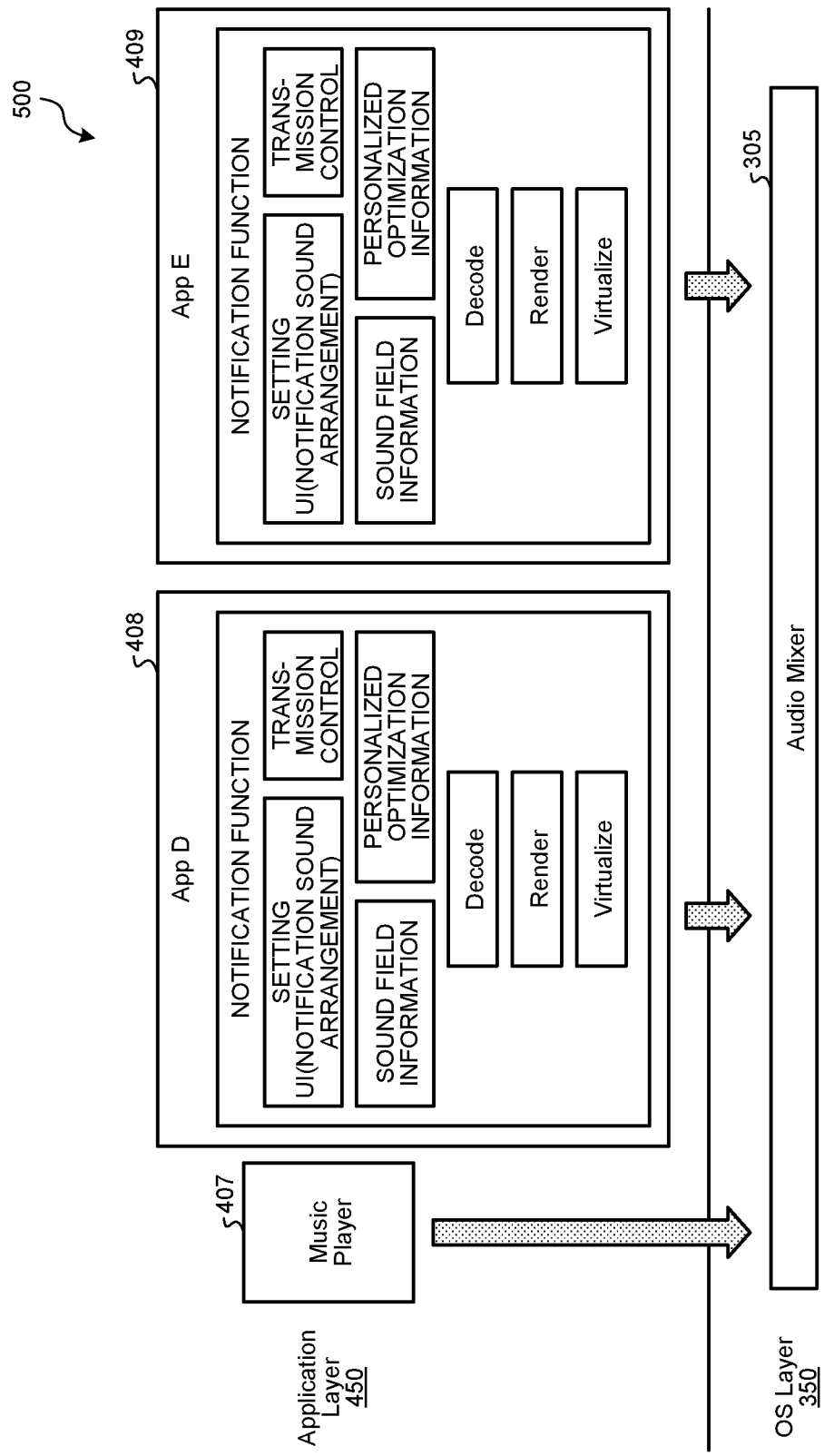
FIG. 11 is a block diagram illustrating an example of a software configuration in a case where a stereophonic sound technology is applied in an information terminal according to a second embodiment of the present disclosure.

FIG. 11 is a block diagram illustrating an example of a software configuration in a case where a stereophonic sound technology is applied in the information terminal 500 according to the second embodiment of the present disclosure. As illustrated in FIG. 11, the information terminal 500 includes, as a software configuration, an application layer 450 and a basic program (OS) layer 350.

In the example of FIG. 11, the application layer 450 includes, for example, a music player 407, a D application 408, an E application 409, and the like as various application programs executed by the information terminal 500.

The music player 407 is an application program capable of reproducing music as appreciation content. The music that can be reproduced by the music player 407 may be for two-channel stereo or for 3D audio.

In a case where music for 3D audio can be reproduced, the music player 407 may have a function of performing decoding processing, rendering processing, and virtualization processing. As a result, music for 3D audio can be output as two-channel stereo from a headphone or the like.

The D application 408 is an application program having a setting UI that enables various settings of a notification sound by the user and a notification function including a function of transmitting a notification sound for 3D audio. Here, the setting UI includes, for example, a notification sound arrangement setting function capable of setting a position where the notification sound sounds in a sound field having a three-dimensional spread. In addition, it is preferable that the D application 408 holds personalized optimization information in order to adapt the arrangement of the positions where the notification sounds sound to individual users.

In addition, the D application 408 has a function of performing decoding processing, rendering processing, and virtualization processing on the notification sound data. The virtualization processing is performed on the basis of the sound field information generated by the user setting acquired by the setting UI and the personalized optimization information. Through these processing, the notification sound for 3D audio can be output as two-channel stereo from a headphone or the like.

The E application 409 is an application program having a setting UI that enables various settings of a notification sound by the user and a notification function including a function of transmitting a notification sound for 3D audio. Here, the setting UI includes, for example, a notification sound arrangement setting function capable of setting a position where the notification sound sounds in a sound field having a three-dimensional spread. In addition, it is preferable that the E application 409 holds personalized optimization information in order to adapt the arrangement of the positions where the notification sounds sound to individual users.

In addition, the E application 409 has a function of performing decoding processing, rendering processing, and virtualization processing on the notification sound data. The virtualization processing is performed on the basis of the sound field information generated by the user setting acquired by the setting UI and the personalized optimization information. Through these processing, the notification sound for 3D audio can be output as two-channel stereo from a headphone or the like.

Note that the personalized optimization information held by each of the D application 408 and the E application 409 is acquired from the user for each of the D application 408 and the E application 409, for example, at the time of initial setting or the like.

In a basic program layer 350, the basic program of the information terminal 500 performs the mixing processing 305 for mixing data to be output among various notification sound data, music data, and the like subjected to virtualization processing by various application programs, and outputs the mixed data.

As described above, in the information terminal 500 according to the second embodiment, each application program has a function of acquiring user settings, performing decoding processing, rendering processing, and virtualization processing, and arranging a position where a notification sound sounds in a sound field that spreads three-dimensionally on the basis of the acquired user settings.

Note that, it can also be understood that the CPU of the information terminal 500 individually executes, for example, the D application 408 and the E application 409, so that the above-described functions are implemented by the display control unit, the input receiving unit, the setting control unit, the notification sound arrangement unit, the output control unit, the personalized optimization information storage unit, and the sound field information storage unit corresponding to the above-described first embodiment, and the above-described various processing are performed.

Figure 12:
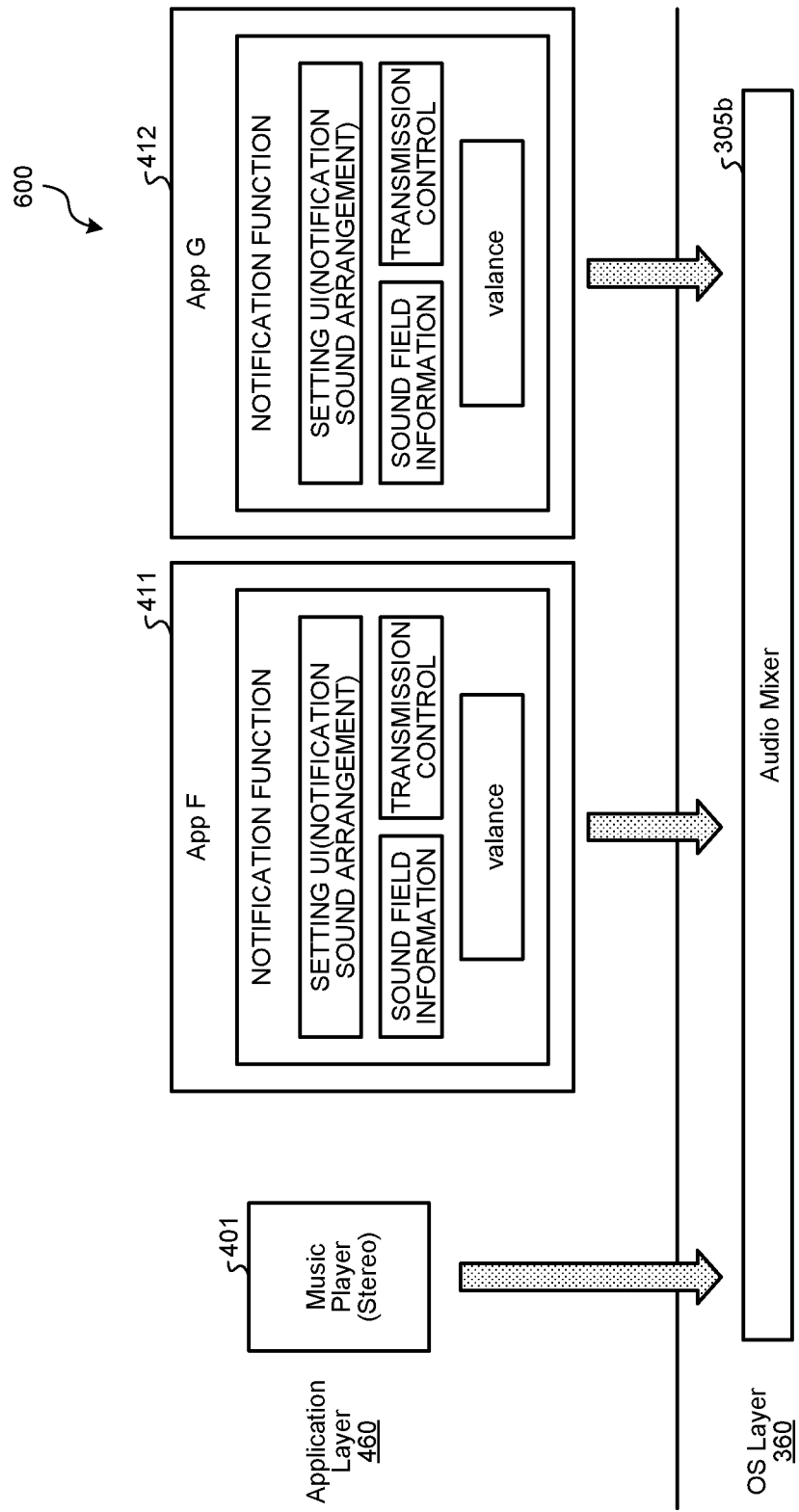
FIG. 12 is a block diagram illustrating an example of a software configuration in a case where a 2-channel stereo technology is applied in the information terminal according to the second embodiment of the present disclosure.

FIG. 12 is a block diagram illustrating an example of a software configuration of an information terminal 600 according to the second embodiment of the present disclosure in a case where the two-channel stereo technology is applied. As illustrated in FIG. 12, the information terminal 600 includes, as a software configuration, an application layer 460 and a basic program (OS) layer 360.

In the example of FIG. 12, the application layer 460 includes, for example, a music player 401, an F application 411, a G application 412, and the like as various application programs executed by the information terminal 600. Among these application programs, the music player 401 is similar to that exemplified in the first embodiment described above.

The F application 411 is an application program having a setting UI that enables various settings of the notification sound by the user, and a notification function including a function of transmitting the notification sound for two-channel stereo. Here, the setting UI includes, for example, a notification sound arrangement setting function capable of setting a position where the notification sound sounds in a sound field having a spread to the left and right.

The user can set a position where various notification sounds sound in the sound field spreading to the left and right by the setting UI. The F application 411 generates sound field information on the basis of the user setting, and generates notification sound data in which the left-right balance is adjusted by balance processing using the sound field information.

The G application 412 is an application program having a setting UI that enables various settings of the notification sound by the user and a notification function including a function of transmitting the notification sound for two-channel stereo. Here, the setting UI includes, for example, a notification sound arrangement setting function capable of setting a position where the notification sound sounds in a sound field having a spread to the left and right.

The user can set a position where various notification sounds sound in the sound field spreading to the left and right by the setting UI. The G application 412 generates sound field information on the basis of the user setting, and generates notification sound data in which the left-right balance is adjusted by balance processing using the sound field information.

In a basic program layer 360, the basic program of the information terminal 600 performs mixing processing 305b for mixing data to be output among various notification sound data, music data, and the like subjected to balance processing by various application programs, and outputs the mixed data.

As described above, in the information terminal 600 according to the second embodiment, each of the application programs has a function of acquiring the user setting and adjusting the left-right balance on the basis of the acquired user setting, thereby arranging the position where the notification sound sounds in the sound field spreading to the right and left.

Note that, it can also be understood that the CPU of the information terminal 600 individually executes, for example, the F application 411 and the G application 412, so that the above-described functions are implemented by the display control unit, the input receiving unit, the setting control unit, the notification sound arrangement unit, the output control unit, and the sound field information storage unit corresponding to the above-described first embodiment, and the above-described various processing are performed.

Note that the effects described in the present specification are merely examples and are not limited, and other effects may be provided.

Other Embodiments

The information terminal according to each of the first and second embodiments and the first to third modifications is, for example, a computer including a CPU, a ROM, a RAM, and an I/O port. However, the information terminal may have a configuration including an application specific integrated circuit (ASIC) dedicated for the application described in the first and second embodiments and the first to third modifications thereof.

The information terminal of each of the first and second embodiments and the first to third modifications includes the ROM in which the program related to the information processing of the notification sound is stored. Such a program can be provided by being stored in a recording medium or the like so as to be readable by a computer, for example. The recording medium is, for example, a magnetic disk, an optical disk, a magneto-optical disk, a flash memory, or the like. Furthermore, the program described above may be distributed via, for example, a network without using a recording medium.

The present technology can also adopt the following configurations.

(1)

An information processing apparatus that controls a plurality of notification sounds output from an output unit, the information processing apparatus comprising:
a notification sound arrangement unit that arranges positions where the plurality of notification sounds sound in a virtual sound field so as to be different from each other for each of the plurality of notification sounds.

(2)

The information processing apparatus according to (1), wherein
the notification sound arrangement unit dynamically arranges a position where at least one of the plurality of notification sounds sounds in the sound field.

(3)

The information processing apparatus according to (2), wherein
the notification sound in which a position to be sounded in the sound field is dynamically arranged is output from the output unit as if the notification sound is sounded while moving in the sound field.

(4)

The information processing apparatus according to any one of (1) to (3), wherein
the plurality of notification sounds include a voice for guiding a route, and
the notification sound arrangement unit causes a position where the voice sounds to coincide with a direction in which the voice guides.

(5)

The information processing apparatus according to any one of (1) to (4), wherein
the notification sound arrangement unit moves, in a case where at least one of the plurality of notification sounds is sounded while an appreciation content is being output from the output unit, a position where the appreciation content sounds in the sound field.

(6)

The information processing apparatus according to (5), wherein
the notification sound arrangement unit moves a position where the appreciation content sounds so as to be away from a position where the notification sound sounded when the appreciation content is being output from the output unit sounds.

(7)

The information processing apparatus according to any one of (1) to (6), further comprising
a setting control unit that causes a user to set the positions where the plurality of notification sounds sound in the sound field.

(8)

The information processing apparatus according to (7), wherein
the setting control unit causes the user to select preset positions as positions where the plurality of notification sounds sound in the sound field.

(9)

The information processing apparatus according to (8), wherein
the setting control unit causes the user to finely adjust the positions where the plurality of notification sounds sound in the sound field from the preset positions.

(10)

The information processing apparatus according to (9), wherein
the setting control unit issues a warning in a case where the positions where the plurality of notification sounds sound in the sound field are set close to each other within a predetermined range.

(11)

The information processing apparatus according to any one of (7) to (10), wherein
the plurality of notification sounds are transmitted by an application program executed by the information processing apparatus, and
the setting control unit is implemented by the application program.

(12)

The information processing apparatus according to any one of (7) to (10), wherein
the plurality of notification sounds are respectively transmitted by a plurality of application programs executed by the information processing apparatus, and
the setting control unit causes the user to collectively set positions where the plurality of notification sounds respectively transmitted by the plurality of application programs sound in the sound field.

(13)

The information processing apparatus according to any one of (7) to (12), further comprising
a display control unit that causes a display unit to display a setting screen that is a screen capable of setting positions where the plurality of notification sounds sound in the sound field, and, with respect to notification sounds to be set among the plurality of notification sounds, allows the user to visually grasp positions where the notification sounds to be set sound in the sound field.

(14)
The information processing apparatus according to (13), wherein
the sound field is a virtual space having a three-dimensional spread, and
the setting screen displays positions where the notification sounds to be set sound in a sphere likened to the sound field according to the setting by the user.

(15)
The information processing apparatus according to (14), wherein
the display control unit causes the display unit to display a confirmation screen which is a screen capable of displaying the positions where the plurality of notification sounds sound in the sound field, and on which each of the positions where the plurality of notification sounds sound in the sphere likened to the sound field is arranged according to the setting by the user.

(16)
The information processing apparatus according to (2) or (3), wherein
the sound field is a virtual space having a three-dimensional spread, and
the information processing apparatus further comprises:
a setting control unit that causes a user to set positions where the plurality of notification sounds sound in the sound field; and
a display control unit that causes a display unit to display a setting screen that is a screen capable of setting of dynamically arranging positions where the plurality of notification sounds sound in the sound field, and, with respect to notification sounds to be set among the plurality of notification sounds, indicates trajectories in which the positions where the notification sounds to be set sound in a sphere likened to the sound field move according to the setting by the user.

(17)
The information processing apparatus according to (16), wherein
the display control unit causes the display unit to display a confirmation screen which is a screen capable of displaying trajectories in which the positions where the plurality of notification sounds sound in the sound field move, and on which each of the trajectories in which the positions where the plurality of notification sounds sound in a sphere likened to the sound field move is arranged according to the setting by the user.

(18)
The information processing apparatus according to any one of (14) to (17), wherein
the notification sound arrangement unit arranges positions where the plurality of notification sounds sound in the sound field on a basis of personalized optimization information in which a head-related transfer function representing how sounds reach left and right ears of the user is adjusted for the user.

(19)
An information processing method for controlling a plurality of notification sounds output from an output unit, the method comprising:
arranging positions where the plurality of notification sounds sound in a virtual sound field to be different from each other for each of the plurality of notification sounds.

(20)
A sound output apparatus comprising:
an output unit that outputs a plurality of notification sounds; and
a control unit that controls the plurality of notification sounds output from the output unit, wherein
the control unit arranges positions where the plurality of notification sounds sound in a virtual sound field to be different from each other for each of the plurality of notification sounds.

Although several embodiments of the present disclosure have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

REFERENCE SIGNS LIST

1 SOUND OUTPUT APPARATUS
100, 100a, 100b, 500, 600 INFORMATION TERMINAL
110 CONTROL UNIT
111 DISPLAY CONTROL UNIT
112 INPUT RECEIVING UNIT
113 SETTING CONTROL UNIT
114 NOTIFICATION SOUND ARRANGEMENT UNIT
115 OUTPUT CONTROL UNIT
116 PERSONALIZED OPTIMIZATION INFORMATION STORAGE UNIT
117 SOUND FIELD INFORMATION STORAGE UNIT
120 DISPLAY UNIT
121, 123 SETTING SCREEN
122, 124 CONFIRMATION SCREEN
130 INPUT UNIT
200 HEADPHONE
210 OUTPUT UNIT

The invention claimed is:

1. An information processing apparatus, comprising:
a central processing unit (CPU) configured to:
receive a first user input;
set, based on the first user input, a plurality of positions of a plurality of notification sounds in a sound field, wherein
the plurality of notification sounds includes a first notification sound at a first position of the plurality of positions and a second notification sound at a second position of the plurality of positions, and
the second position is different from the first position; and
transmit a warning to an output device based on a distance between the first position and the second position is within a specific range.

2. The information processing apparatus according to claim 1, wherein the CPU is further configured to dynamically set a corresponding position of the plurality of positions for a corresponding notification sound of the plurality of notification sounds in the sound field.

3. The information processing apparatus according to claim 2, wherein the CPU is further configured to:

transmit the corresponding notification sound to the output device based on the corresponding position; and change the corresponding position based on a movement of the corresponding notification sound in the sound field.

4. The information processing apparatus according to claim 2, wherein the sound field is a virtual space that includes a three-dimensional spread, the CPU is further configured to control a setting screen to dynamically set the plurality of positions of the plurality of notification sounds in the sound field, the plurality of positions indicates a plurality of trajectories, the plurality of trajectories indicates a plurality of movements of the plurality of positions in a sphere, the sphere indicates the sound field, and the plurality of movements is based on a second user input.

5. The information processing apparatus according to claim 4, wherein the CPU is further configured to control a confirmation screen to display the plurality of trajectories in the sphere.

6. The information processing apparatus according to claim 1, wherein the plurality of notification sounds includes a voice that guides a route, and the CPU is further configured to set a specific position of the plurality of positions to coincide with a direction of the voice.

7. The information processing apparatus according to claim 1, wherein the CPU is further configured to change, based on at least one of the plurality of notification sounds and an appreciation content is output from the output device at a specific time, a specific position of the appreciation content in the sound field.

8. The information processing apparatus according to claim 7, wherein the CPU is further configured to change the specific position of the appreciation content at a specific distance from a corresponding position of the plurality of positions for a corresponding notification sound of the plurality of notification sounds.

9. The information processing apparatus according to claim 1, wherein the CPU is further configured to select specific positions of the plurality of positions based on the first user input.

10. The information processing apparatus according to claim 9, wherein the CPU is further configured to change the specific positions based on a second user input.

11. The information processing apparatus according to claim 1, wherein the CPU is further configured to implement an application to transmit the plurality of notification sounds to the output device.

12. The information processing apparatus according to claim 1, wherein the CPU is further configured to:

implement a plurality of applications to transmit the plurality of notification sounds; and collectively set, based on the first user input, the plurality of positions of the transmitted plurality of notification sounds in the sound field.

13. The information processing apparatus according to claim 1, wherein the CPU is further configured to control a setting screen, to display a corresponding position of the plurality of positions for a corresponding notification sound of the plurality of notification sounds in the sound field.

14. The information processing apparatus according to claim 13, wherein the sound field is a virtual space that includes a three-dimensional spread, the CPU is further configured to control the setting screen to display the plurality of positions of the plurality of notification sounds set in a sphere, and the sphere indicates the sound field.

15. The information processing apparatus according to claim 14, wherein the CPU is further configured to control, based on the plurality of positions set in the setting screen, a confirmation screen to display the plurality of positions of the plurality of notification sounds in the sphere, and the sphere indicates the sound field.

16. The information processing apparatus according to claim 14, wherein the CPU is further configured to set the plurality of positions in the sound field based on personalized optimization information, and the personalized optimization information includes a head-related transfer function.

17. An information processing method, comprising:

receiving a user input;

setting, based on the user input, a plurality of positions of a plurality of notification sounds in a sound field, wherein the plurality of notification sounds includes a first notification sound at a first position of the plurality of positions and a second notification sound at a second position of the plurality of positions, and the second position is different from the first position; and transmitting a warning to an output device based on a distance between the first position and the second position is within a specific range.

18. A sound output apparatus, comprising:

an output device configured to output a plurality of notification sounds; and a central processing unit (CPU) configured to:

receive a user input;

set, based on the user input, a plurality of positions of the plurality of notification sounds in a sound field, wherein the plurality of notification sounds includes a first notification sound at a first position of the plurality of positions and a second notification sound at a second position of the plurality of positions, and the second position is different from the first position; and transmit a warning to the output device based on a distance between the first position and the second position is within a specific range.

\* \* \* \* \*